No. 731,064. PATENTED JUNE 16, 1903.
T. C. McBRIDE.
FEED WATER HEATING SYSTEM.
APPLICATION FILED OCT. 29, 1902.
NO MODEL. 2 SHEETS—SHEET 1.
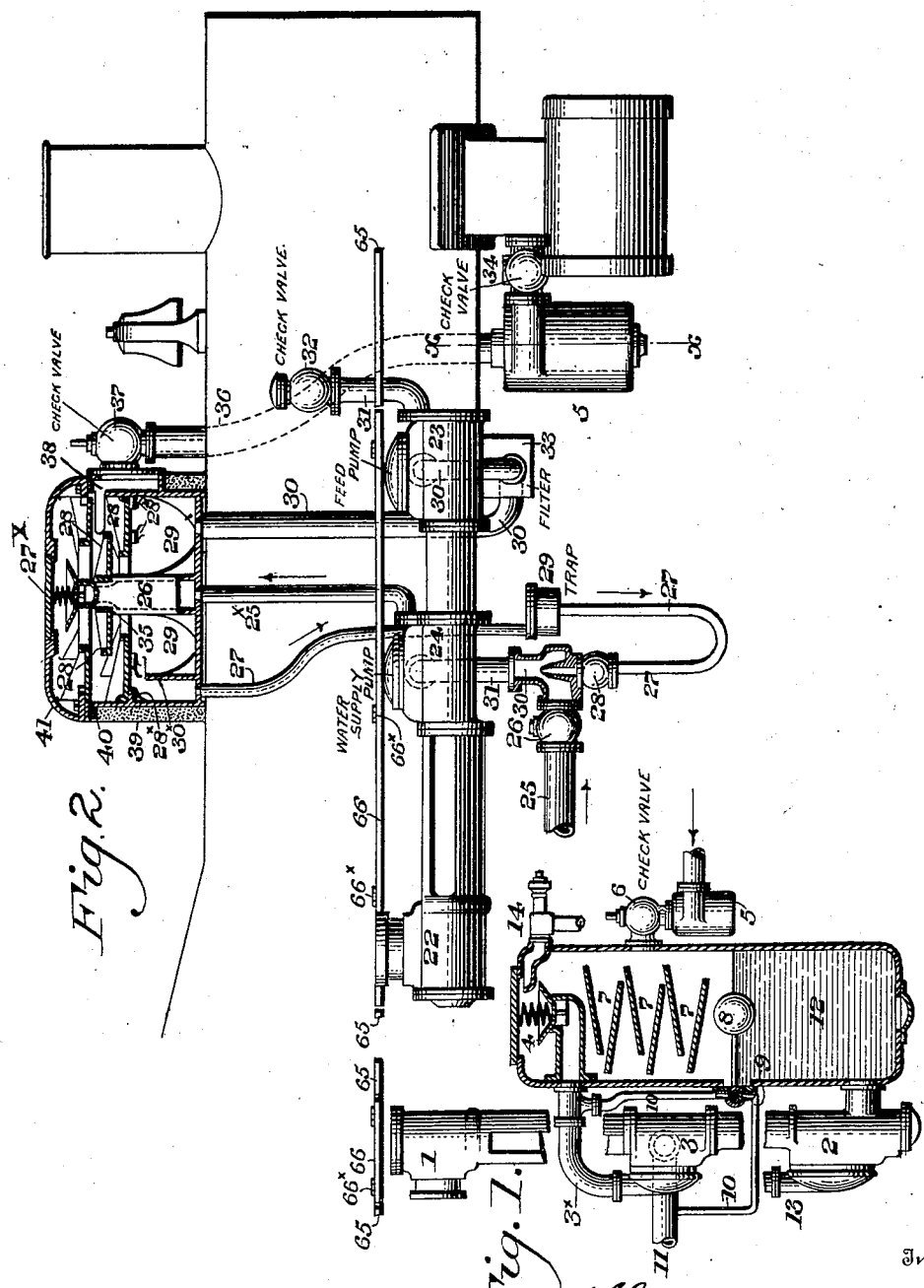

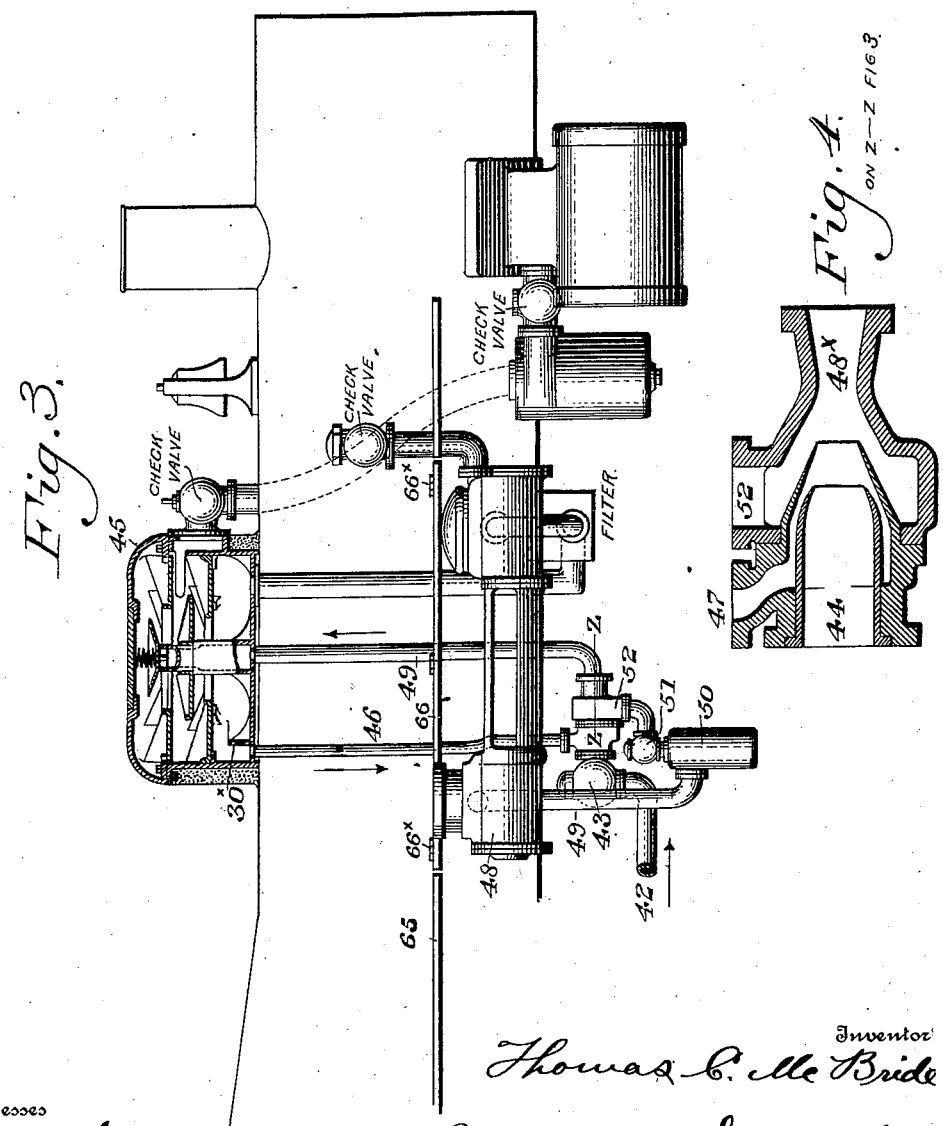

No. 731,064. Patented June 16, 1903.

UNITED STATES PATENT OFFICE.

THOMAS C. McBRIDE, OF PHILADELPHIA, PENNSYLVANIA.

FEED-WATER-HEATING SYSTEM.

SPECIFICATION forming part of Letters Patent No. 731,064, dated June 16, 1903.

Application filed October 29, 1902. Serial No. 129,184. (No model.)

*To all whom it may concern:*

Be it known that I, THOMAS C. MCBRIDE, a citizen of the United States, residing in the city and county of Philadelphia, State of Pennsylvania, have invented a new and useful Improvement in Feed-Water-Heating Systems for Locomotive and other Boilers, of which the following is a specification.

In the art of open feed-water heaters where water is supplied under a pressure not sufficient to drive it into the heater it has heretofore been customary to use a water-supply pump whose function is to pump water from the source of supply to the heater and a feed-pump which takes the heated water from the heater and supplies it to the boiler. The speed of either one of these two pumps, generally the feed-pump, is controlled by a float or some similar arrangement in the heater. It is, however, evident that with this arrangement the feed-pump will be required to pump more water in a given time than the water-supply pump in proportion to the amount of exhaust-steam condensed in the feed-water heater, and therefore added to the volume of the water to be handled by the feed-pump. It has also heretofore been proposed to have two pumps positively connected together, the feed-pump being made sufficiently larger than the supply-pump so as to take care of the increased amount of water required to be handled by the feed-pump on account of the condensation in the heater; but this construction has involved the necessity of the feed-pump taking all of the water coming from the heater and the existence of a free outlet in the pipe between the feed-pump and the boiler, whereby any water not needed in the boiler may be returned to the source of supply, a suitable valve manipulated by hand being employed as the amount of water in the boiler may require. In other words, the adjustment of this system occurred at a point between the feed-pump and the boiler.

For certain cases, notably where it is necessary to use a comparatively small feed-water heater, a more exact and instantaneous regulation of the amount of water present at any time in the heater is required. To accomplish this and also to simplify the feed and heating systems, I have devised the present system. This system regulates the amount of water in the heater at any time—that is, the heater water-level—by two separate adjustments. The first or approximate adjustment consists in sending to the heater only that amount of water which, with the minimum amount of steam likely to be condensed by it in the heater at any time, will furnish the feed-pump with its full quota of water. A greater amount of exhaust-steam coming to the heater than this will result in a tendency to accumulate in the heater a slight excess, and the taking care of this slight excess by returning it to the source of supply constitutes our second or final and exact adjustment of the amount of water in the heater.

To the above ends my invention consists, broadly, in the furnishing of a feed-water heater with amounts of water always proportional to the amount of water being taken out by the feed-pump, this being very easily accomplished by arranging the means of heater-supply to be actuated or controlled by the feed-pump—that is, to deliver an amount of water proportional to the speed of the feed-pump—and the provision of a slight excess of water for the heater, which is returned by means described to the source of supply or supply-piping.

My invention also consists in the novel construction of a feed-water-heating system for locomotive and other boilers.

It further consists of novel details of construction, all as will be hereinafter set forth.

Figure 1 represents a sectional view, partly in elevation, of a feed-water-heating system embodying my invention. Fig. 2 represents a side elevation of a locomotive or other boiler having my feed-water-heating system and its adjuncts applied thereto, certain parts of the apparatus being shown in section. Fig. 3 represents a side elevation of a boiler and feed-water heater similar to Fig. 2, but showing a slightly-modified form of apparatus. Fig. 4 represents on an enlarged scale a section on line *z z*, Fig. 3.

Similar numerals of reference indicate corresponding parts in the figures.

Referring to the drawings, 1 designates the steam-cylinder, and 2 the feed-water-pumping cylinder, together with the water-supply-pumping cylinder 3 of a pump which I preferably employ. The supply-water coming to the cylinder 3 through the inlet 11 is pumped through piping 3× and the spraying device 4 into the heater 12, where it meets and condenses the exhaust-steam, reaching the heater through the oil-separator 5 and check-valve 6, becoming heated thereby as it falls over the pans 7. As water tends to accumulate in the heater the float 8 will rise and, opening the valve 9, controlled thereby, will prevent any excess of water accumulating in the heater, because of this excess being returned to the supply-pipe 11 through the by-pass pipe 10. The spraying device 4 is so constructed as to offer sufficient resistance to the passage of the water as to compel the passage of some of it through the valve 9 in spite of any little pressure in the supply-pipe 11. The feed-pump cylinder 2 takes hot water from the body of the heater 12, pumping it through the delivery-pipe 13 and the usual means employed for that purpose into the boiler. The space at the bottom of the heater is made sufficiently large not only for storage of a considerable volume of water, but also to accommodate the usual filter. (Not shown.)

14 shows a safety-valve to prevent accidental high-pressure bursting the heater and also affords a means of discharge of any air which might collect in the heater and cause it to become air-bound.

Fig. 2 shows another heater arrangement, in which 22 is the steam-cylinder, 23 the feed-water cylinder, and 24 the heater supply-cylinder, of a double direct-acting pump, like that of Fig. 1. Water coming through the supply-pipe 25 and passing through check-valve 26 meets the excess water, described above, returning from the heater through the overflow-pipe 27 and check-valve 28.

29 designates an ordinary steam-trap which may be used in the overflow-pipe 27 in case the exhaust-steam pressure in the heater is likely to be high and to drive all of the water out of the pipe 27, and thus permit of exhaust-steam from the heater finding its way through the fitting 30, to be hereinafter described, and against the check-valve 26, thereby holding the same closed and preventing the supply-water coming to the system through supply-pipe 25. The trap 29 may be of any suitable construction which would permit the passage of water through it, but prevent passage of steam. Instead of the trap 29, or in addition to it, the lower part of the overflow-pipe 27 may have a long descending loop or two or more loops, which would trap this pipe and accomplish the same result as or assist the trap 29.

It is evident that the supply-pipe 25 and overflow-pipe 27 might be connected by any of the usual pipe-fittings; but the injector arrangement 30 may be used, if desired, in order that the velocity of flow of supply-water may be assisted by the velocity of flow of overflow-water coming through pipe 27 or, if trap 29 is not used, by the velocity of the mixture of water and steam which would at times come through the pipe 27. The mixture of supply-water and overflow-water through supply-pump suction 31, supply-pump cylinder 24, and delivery-pipe 25× is pumped into the heater through the passage 26 and spraying device 27× and falls over pans 28 into the bottom of the heater-space 29, it being apparent that any excess of water overflows over dam 30× and into the overflow-pipe 27. The pans 28 are provided with raised division-walls or partitions in order that the water which has been uniformily distributed into the heater by the spraying device 27× may by means of these divisions be continued in its uniform distribution as it falls over the pans.

From the body of the heater 29 the feed-pump suction-pipe 30, feed-pump cylinder 23, and feed-pump delivery-pipe 31 and check-valve 32 deliver the heated water to the boiler.

33 designates the usual filtering arrangement for such heating systems, which I have not deemed necessary to describe in detail. Exhaust-steam finds its way to the heater through the check-valve 34, oil-separator 5, exhaust-pipe 36, check-valve 37, and passage 38, which is continued around the heater for a certain distance in order that the exhaust-steam may be uniformly distributed to various parts of the interior of the heater.

It will be apparent that the space 38 opens into the heater well up under one of the upper pans 28 in order that water may not splash into it and also that the dam 30× is continued well up under the lower pan 28. The pans 28 of this heater and the pans or baffle-plates 7 of the heater 12 (seen in Fig. 1) are both loosely attached in order that they may be easily removed for cleaning or for the purposes of inspection or repairs. In the construction of the heater of Fig. 2 it will be noted that the removal of the lagging 39 permits the removal of bolts 40, so that the top of the heater 41 may be removed and simultaneously with it the top pan 28. The second pan 28 rests on the shoulders 35 on the pipe 26, and the third pan 28 rests on the lugs 28× on the inside of the heater. Instead of placing the filter, as shown at 33, in the feed-pump suction-pipe 30 it may be placed in and made part of the space 29 in the bottom of the heater, or instead of the dam 30× and overflow-pipe 27 a float similar to 8 of Fig. 1 may be placed in the space 29 and control a valve opening into the overflow-pipe 27, so that the raising of this float, due to too much water in the heater, will open this valve and permit this excess to escape through 27, or the falling of this float might close the valve leading into 27, as will be apparent to those skilled in this art. It will also be understood that the heater described above would have same safety-valve as the heater first described. It is also evident that an injector operated by the exhaust-steam from the feed-pump would furnish a means of supplying water to the heater, delivering an amount of water which would be proportional to the speed of the pump and stopping its delivery altogether should the feed-pump stop.

In Fig. 3 I have shown such an arrangement as above referred to and in Fig. 4 an enlarged sectional view of the injector. Supply-water comes to the system through supply-pipe 42 and check-valve 43, entering the inlet-nozzle 44 of the injector, as will be understood from Fig. 4. The heater of this system is shown at 45 and is in all substantial respects the same as the heater seen in Fig. 2. The overflow-pipe 46 may or may not be trapped, according to requirements, either by a trap, as shown at 29 in Fig. 2, or by a descending loop, as shown in the same figure, and reaches the overflow-inlet 47. (Shown in Fig. 4.) The feed-pump steam-cylinder 48 has an exhaust-pipe 49, oil-separator 50, check-valve 51, and piping so arranged that the feed-pump exhaust enters the injector through the opening 52, which for convenience of illustration is shown at the bottom of the injector in Fig. 3 and at the top of the sectional view in Fig. 4. It is evident that the feed-pump exhaust-steam reaching the supply-water injector through opening 52 will first act on overflow-water entering through 47 and that these will combine in the space $48^{\times}$. After acting on the overflow-water the steam-pump exhaust-steam would also act on supply-water coming through the supply-pipe 42 and opening 44, delivering both, through the opening $48^{\times}$ and heater supply-pipe 49, to the heater. The course of the water through the heater of Fig. 3 and the supply of exhaust-steam thereto, together with the course of the heated water after leaving the heater and on its passage through the feed-pump and to the boiler, will be substantially the same as in Fig 2.

Special attention is called to the fact that the water-supply injector of Fig. 4 when not provided with trap in pipe 46 or when trap accidentally fails to work is so arranged that the feed-pump exhaust-steam will first act on any overflow-water coming from the heater and return it thereto. In the meantime the feed-pump will have been taking water from the heater, so that the overflow-water will cease, and the feed-pump exhaust-steam entering through the opening 52 combined with the additional exhaust-steam from the heater, which will then find its way over the dam $30^{\times}$ through the overflow-pipe 46 and opening 47 and will begin to supply an increased amount of water to the heater drawn through supply-pipes 42 and opening 44. This combination of effects and arrangement of the injector is very convenient, in that as long as hot water overflows from the heater and the heater therefor does not need any additional water this hot overflow-water will interfere with the action of the injector and additional cold water will not be supplied to the heater; but when the heater overflow-water ceases the feed-pump exhaust entering the injector through 52 and heater exhaust-steam entering the injector through 47 combine their energies to supply a larger amount of water to the heater from the source of supply.

I have shown the pumping apparatus located just under or in proximity to the foot-board and cab-floor 65 on the locomotive or other engine, said foot-board and cab-floor being provided with movable lids or doors 66, with hinges $66^{\times}$ for permitting access to said apparatus.

It will be understood that while I have shown my invention as especially applicable to locomotive-boilers, the same is equally well adapted to other situations.

It will be apparent that changes may be made by those skilled in the art in the manner of assembling the various elements composing my improved feed-water-heating system and that I do not desire to be limited in every instance to the exact construction I have herein shown and described.

Having thus described my invention, what I claim as new, and desire to secure by Letters Patent, is—

1. The combination of a steam-boiler, a feed-pump, a heater, means for supplying water to said heater, and means for returning any excess of water from said heater to the water-supply, said water-supply means being adapted to operate in unison with said feed-pump.

2. The combination of a steam-boiler, a feed-pump, a heater, means for supplying water to said heater, and an overflow-passage in said heater and communicating with the water-supply, said water-supply means being adapted to operate in unison with said feed-pump.

3. The combination of a steam-boiler, a feed-pump, a heater, means for supplying water to said heater, means for returning any excess of water from said heater to the water-supply, said water-supply means being adapted to operate in unison with said feed-pump, and a trap in said water-returning means.

4. In a feed-water system for locomotive or other boilers, a heater-casing, a pumping apparatus, comprising a steam-cylinder, a water-supply pump and a feed-pump, said water-supply pump being of less capacity than said feed-pump, a discharge-pipe leading from said water-supply pump to said heater-casing, an overflow-pipe leading from said casing to the suction of said water-supply pump and having a trap therein, a pipe leading from the lower portion of said heater to said feed-pump and having a filtering device therein, and a pipe having a check-valve therein leading from said feed-pump to the boiler.

5. In a feed-water system for locomotive or other boilers, a heater-casing, a pipe for conveying exhaust-steam thereto, a combined pumping apparatus comprising a steam-engine, a water-supply pump and a feed-pump, a connection to the latter from said casing, an inlet-pipe leading to said supply-pump, a spraying device in said casing, a discharge-pipe leading from said water-supply pump to said spraying device and a plurality of baffle-plates arranged in staggered order below said spraying device.

6. In a feed-water system for locomotive or other boilers, a heater-casing, a pipe for conveying exhaust-steam thereto, a combined pumping apparatus comprising a steam-engine, a water-forcing device and a feed-pump, a connection to the latter from said casing, an inlet-pipe leading to said water-forcing device, a spraying device in said casing, a discharge-pipe leading from said water-forcing device to said spraying device and a plurality of baffle-plates arranged in staggered order below said spraying device, in combination with means dependent on or controlled by water-level in casing for preventing accumulation of water in said casing.

7. In a feed-water system for locomotive or other boilers, a plurality of pumping devices so connected together or to the same source of power that the amount of water delivered by each is equal or nearly so, one of said pumping devices being adapted to feed the boiler and the other to supply the heater and means for causing any excess of water provided for the heater, to return to the supply.

8. In a feed-water system for locomotive or other boilers, a feed-pump, and means for supplying the heater with quantities of water proportional to the speed of the feed-pump, said heater having means of returning to the source of supply, any excess of water tending to accumulate therein.

9. In a feed-water system for locomotive and other boilers, a heater-casing, a pumping apparatus, comprising a steam-cylinder, a feed-pump, and a water-forcing device operated or controlled thereby, said water-forcing device furnishing a supply of water to the heater, an overflow opening or pipe leading from the heater-casing at the desired water-level therein, and a connection from said casing to said feed-pump.

10. In a feed-water system for locomotive and other boilers, a heater-casing, a pumping apparatus, comprising a steam-cylinder, a feed-pump, and a device for forcing water to the heater in quantities proportionate to the speed of the feed-pump, a discharge-pipe leading from said water-forcing device to said heater-casing, an overflow-pipe leading from said casing to the suction of said water-forcing device and having a trap therein, a pipe leading from the lower portion of said heater to said feed-pump and having a filtering device therein, and a pipe having a check-valve therein leading from said pump to the boiler.

11. In a feed-water system for locomotive and other boilers, a heater-casing, a pipe for conveying exhaust-steam thereto, a pumping apparatus comprising a steam-engine, a feed-pump and a water-forcing device operated or controlled thereby, a connection to the feed-pump from said casing, an inlet-pipe leading to said water-forcing device, a spraying device in said casing, a discharge-pipe leading from said water-forcing device to said spraying device, and a plurality of baffle-plates arranged in staggered order below said spraying device.

12. In a feed-water system for locomotive and other boilers, a heater-casing, a pumping apparatus, comprising a steam-cylinder, a feed-pump, and a water-forcing device operated or controlled thereby, said water-forcing device furnishing a supply of water to the heater, an overflow opening or pipe leading from the heater-casing at the desired water-level therein, and entering the water-supply pipe to the heater through an injector-like jet in the direction of the motion of the water in said supply-pipe.

13. In a feed-water system for locomotive or other boilers, a plurality of pumping devices so connected together or to the same source of power that the amount of water delivered by each is equal or nearly so, one of said pumping devices being adapted to feed the boiler and the other to supply the heater and means for causing any excess of water provided for the heater, to return to the supply-pipe, entering the same through an injector-like jet in the direction of the water passing through said pipe.

14. In a feed-water system for locomotive or other boilers, a heater-casing, a pumping apparatus, comprising a steam-cylinder, a water-supply pump and a feed-pump, (said water-supply pump being of less capacity than said feed-pump,) a discharge-pipe leading from said water-supply pump to said heater-casing, an overflow-pipe leading from said casing to the suction of said water-supply pump and having a trap therein, and entering the suction-pipe of the water-supply pump through an injector-like jet in the direction of motion of the water therein.

THOMAS C. McBRIDE.

Witnesses:
E. HAYWARD FAIRBANKS,
JOHN A. WIEDERSHEIM.